United States Patent [19]

Stamegna et al.

[11] Patent Number: 4,711,929
[45] Date of Patent: Dec. 8, 1987

[54] ACRYLOURETHANE REACTION PRODUCT

[75] Inventors: Andrew P. Stamegna, Wilmington, Del.; Clifford H. Strolle, Springfield, Pa.

[73] Assignee: E. I. Du Pont de Nemours and Company, Wilmington, Del.

[21] Appl. No.: 934,824

[22] Filed: Nov. 25, 1986

Related U.S. Application Data

[62] Division of Ser. No. 712,768, Mar. 18, 1985, Pat. No. 4,659,780.

[51] Int. Cl.[4] .......................................... G08F 265/02
[52] U.S. Cl. .................................... 525/131; 524/539; 525/440
[58] Field of Search .......................................... 525/131

[56] References Cited

U.S. PATENT DOCUMENTS

| Re. 28,715 | 2/1976 | Stamberger | 525/131 |
|---|---|---|---|
| 3,028,367 | 4/1962 | O'Brien | 525/131 |
| 3,284,415 | 11/1966 | Horvath | 525/131 |
| 3,975,457 | 8/1976 | Chang et al. | 525/131 |
| 4,143,091 | 3/1979 | Chang et al. | 525/131 |
| 4,281,078 | 7/1981 | Strolle et al. | 525/131 |
| 4,322,508 | 3/1982 | Peng et al. | 525/131 |

Primary Examiner—Joseph L. Schofer
Assistant Examiner—Bernard Lipman
Attorney, Agent, or Firm—Richard H. Burgess

[57] ABSTRACT

The ungelled reaction product of an acrylic prepolymer, a diol and a diisocyanate, reacted in the presence of a small amount of a monoalcohol to prevent gelling, is an acrylourethane polymer which may be acid modified and is useful in high solids coating compositions.

4 Claims, No Drawings

ACRYLOURETHANE REACTION PRODUCT

This is a division of application Ser. No. 712,768, filed Mar. 18, 1985, now U.S. Pat. No. 4,659,780.

BACKGROUND

The present invention concerns an acrylourethane polymer useful in high solids coating compositions.

Environmental and economic concerns often make it desirable to minimize the quantity of organic solvent released to the atmosphere in the application of paints, such as to automobiles, either in single color coats or in color coat/clear coat or other applications. One way to do this is to make a paint with higher solids content which contains less solvent to evaporate. Several properties must be balanced and reconciled in developing such a paint.

It would be desirable to have polymers which can be used to make paints with relatively high solids content and low viscosity.

While acrylourethane coating compositions are known including U.S. Pat. Nos 4,304,706 (1981); 4,208,494 (1980); 4,208,495 (1980); 3,975,457 (1976); and 3,919,351 (1975) all to Chang et al, it is difficult to find combinations and proportions of acrylic, diol and diisocyanate that will not gel on reaction. In U.S. Pat. No. 4,208,495, Example 1 uses certain monoalcohols during the reaction to avoid gelling, however, the low level of hydroxyl ethyl acrylate such as 9% or less does not permit suitable curing at bake temperatures as low as might be desired.

SUMMARY OF THE INVENTION

The ungelled reaction product, by weight based on total polymer solids, of (a) 50–70% of an acrylic prepolymer having a number average molecular weight of 2,000–10,000 and an average of 5–15, hydroxyl groups per chain, said prepolymer comprising the following monomers in percent by weight based on the prepolymer: 40–60% of one or more of butyl methacrylate or butyl acrylate, 10–30% lauryl methacrylate, 20–40% of one or more of hydroxyethyl acrylate, hydroxyethyl methacrylate, hydroxypropyl acrylate or hydroxypropyl methacrylate, and 0–30% of one or more of styrene, methyl methacrylate and ethyl methacrylate, (b) 20–35% of at least one of a monomeric diol and an oligomeric diol having a number average molecular weight of 200–2,000, (c) 5–15% of an aliphatic or aromatic diisocyanate, and (d) 1.0–4.0% of a monofunctional alcohol.

DETAILED DESCRIPTION

An acrylic prepolymer of number average mclecular weight of 2,000–10,000 (preferably 3,000–5,000) having an average of 5–15 hydroxyl groups per chain (preferably 6–12) is first prepared at temperatures of 130°–160° C. The monomer composition of the acrylic can be varied according to end use. Typical monomers are styrene, butyl acrylate, methyl methacrylate, n-butyl methacrylate, lauryl methacrylate, ethyl methacrylate and such hydroxy containing monomers as hydroxy ethyl acrylate or hydroxy propyl methacrylate. This acrylic prepolymer is prepared at 60–70% weight solids and is then co-reacted with various diols and diisocyanates in the presence of tin catalysts and traces of monofunctional alcohols to provide for hydroxy-functional acrylourethanes. The mole ratio of diol to diisocyanate is about 1 to 1.

Monofunctional alcohol is present during the polymerization reaction at levels of 1.0–4.0% on total polymer solids with a preferred level of 2.5%. This alcohol is present to prevent gellation since the mole ratio of diol to diisocyanate inherently leads to a gelling network.

The amount of hydroxyl extension can be varied from 5 to 50% of the existent acrylic hydroxyl groups with a preferred limit of 10–30%. The range of 20–40% of hydroxy ethyl acrylate or related monomers permits curing in the range of 110°–132° C., preferably 121° C., for about 30 min.

The diol portion can be comprised of monomeric diols such as neopentyl glycol, ethylene glycol, cyclohexanedimethanol, 1,6-hexane diol, 1,4-butane diol or any other suitable diol having from 2–10 carbons. The diol portion can also be of an oligomeric ester-diol type such as polycaprolactone diol or any polyester diols having number average molecular weights in the range of 200–2,000 with those of Mn 500–1,500 being preferred.

The diisocyanate can be either aliphatic or aromatic in nature such as isophorone diisocyanate, bis-cyclohexylmethylene-4,4'-diisocyanate, hexamethylene diisocyanate, trimethyl hexamethylene diisocyanate and toluene diisocyanate.

The acid content of the acrylourethanes can be controlled either by post reaction with various anhydrides such as o-phthalic, succinic, glutaric or trimellitic anhydrides to acid numbers of 10 or greater (15–25 preferred) or by carrying the chain extension out in the presence of such extending diols as dimethylolproionic acid.

Acrylourethanes prepared by the methods described in the examples can be formulated into high solids flexible coating which provide for coatings exhibiting excellent low temperature flexibility, good mar resistance and toughness under normal conditions.

EXAMPLES

In the following examples, parts, percentages and proportions are by weight except where indicated otherwise.

Example 1a—Acrylic Prepolymer

50% butyl methacrylate
20% lauryl methacrylate
30% hydroxy ethylacrylate

To a 5-liter flask equipped with electric heating mantle, mechanical stirrer, batch and vapor thermometers, water cooled condenser, nitrogen purge and addition funnels are added 100 grams of xylene and 900 grams of aromatic hydrocarbon (bp. 160°–170° C.). The solvent is heated to reflux at batch temperature of 150°–160° C.

A mixture of 1200 g n-butyl methacrylate, 400 g lauryl methacrylate and 720 g hydroxyethyl acrylate is added to the flask over a 4-hour period. A solution of 38 grams of a 70% solution of t-butyl peracetate and 30 grams of xylene is added concomitantly with the monomer mix over 4 hours and twenty minutes. The batch is kept at reflux during the additions and for twenty minutes beyond the initiator feed at 150°–160° C. The resultant acrylic resin has the following characteristics:

Theoretical Acid No: 1–5 mg KOH at 100% weight solids

Theoretical Hydroxyl No.: 140–150 mg KOH at 100% weight solids

Glass transition temperatures (Tg) −36° C. as measured by differential scanning calorimetry (DSC)

% Wt. Solids: 67–69% (determined with heating at 110° C. for 1 hr)

Gardner-Holdt viscosity=T-V @25° C.

GPC (gel permeation chromatography) molecular weight distribution:
number average Mn=3570
weight average Mw=7520
Z average Mz=13200
polydispersity d2.10

Example 1b—Acrylourethane Resin

To a 12-liter flask equipped with electric heating mantle, mechanical stirrer, batch and vapor thermometers, nitrogen purge, water cooled condenser and addition funnel are added 6710.60 g of acrylic prepolymer from Example 1a, 1832.2 g CAPA-210 polycaprolactone diol, 175.4 g n-butyl alcohol, 0.4 g of dibutyl tin dilaurate, and 1066.3 g of methyl ethyl ketone.

The mixture is heated to reflux at temperatures of 105°–115° C. and then 480 g of "Desmodur-W" diisocyanate and added over 30 minutes. The mixture is then heated at reflux for 3 hours at 105°–115° C. at which point the isocyanate is completely consumed as monitored by infrared. The resultant resin has the following characteristics:

at 105°–115° C. at which point the isocyanate is completely consumed as monitored by infrared. The resultant resin has the following characteristics:

Acid No.: 1–5 mg KOH
Hydroxyl No.: 110–120 mg KOH
% Wt. Solids=67–69% (110° C. for 1 hr)
Gardner-Holdt viscosity: O-Q at 25° C.
Tg for the two polymer components: −48° C. and −4° C. (DSC)
GPC Mol Wt.
Mn=3720
Mw=21700
Mz=84100
d=5.83

Example 2—Acid Modified Acrylourethane

The acrylourethane from Example 1b can be post reacted with trimellitic anhydride in the following manner.

Upon completion of the chain extension reaction, the batch is allowed to cool to 80° C. or less to provide for safe solids addition. A total of 218.15 g of trimellitic anhydride is added and the mixture is then heated at reflux at 105°–115° C. for 30 minutes or until the acid number is 15–22 mg KOH. The characteristics of the resin are Acid No.: 15–20 mg KOH
Hydroxyl No.: 100–110 mg KOH
% Wt. Solids: 69–71 (110° C. for 1 hr)
Gardner-Holdt viscosity: S-U at 25° C.
Tg: −45° C. and −4° C. as measured by DSC
GPC Mol Wt. same as Example 1b Example 3—Coatings from Acrylourethanes Polymers of the present invention have been formulated into various high solids flexible enamels. A typical coating composition for an unpigmented clear flexible enamel is as follows:

60 parts solid acrylourethane resin of Example 1b
40 parts Resimene 755 melamine-formaldehyde crosslinking resin made by Monsanto
2 parts on binder of Tinuvin 328 ultraviolet absorber made by Ciba Geigy
1 part on binder of Tinuvin 079 hindered amine light stabilizer made by Ciba Geigy
1.2 parts on binder dodecyl benzene sulfonic acid.

The clear coating is diluted to 60% weight solids with a 1/1 blend of xylene and methyl amyl ketone to a viscosity of 35–40 seconds #2 Fisher cup. The clear coating is then spray applied to primed RIM substrate to give a dry film build of 50 μm ±2.5 μm of (2.0 mils ±0.1 mils) at a bake of 250° F. for 30 minutes.

This clear coating exhibits excellent low temperature flexibility as tested by a bend test over a 1.27 cm (½ inch) cylindrical mandrel at −20° F. The hardness is measured at 2.0–3.0 Knoops by Tukon hardness, and the clear coating has excellent humidity resistance and adhesion after exposure to 96 hours at 100° F. and 100% relative humidity.

I claim:

1. The ungelled reaction product, by weight based on total polymer solids, of
   (a) 50–70% of an acrylic prepolymer having a number average molecular weight of 2,000–10,000 and an average of 5–15, hydroxyl groups per chain, said prepolymer comprising the following monomers in percent by weight based on the prepolymer;
   40–60% of one or more of butyl methacrylate or butyl acrylate
   10–30% lauryl methacrylate
   20–40% of one or more of hydroethyl acrylate, hydroxyethyl methacrylate, hydroxypropyl acrylate or hydroxypropyl methacrylate, and
   0–30% of one or more of styrene, methyl methacrylate and ethyl methacrylate,
   (b) 20–35% of at least one of a monomeric diol and an oligomeric diol having a number average molecular weight of 200–2,000,
   (c) 5–15% of an aliphatic or aromatic diisocyanate, and
   (d) 1.0–4.0% of a monofunctional alcohol, said reaction being performed by first forming the acrylic prepolymer of (a) then mixing with (a) the diol of (b) and the alcohol of (d), then mixing therewith the diisocyanate of (c)
   in which 5–50% of the hydroxyl groups on the acrylic prepolymer have reacted with diol or diisocyante,
   which has been further reacted with enough of an anhydride to give an acid number of at least 10.

2. The reaction product of claim 1 in which the acid number is 15–25.

3. The reaction product of claim 2 in which the anhydride is at least one selected from o-phthalic, succinic, glutaric and trimellitic anhydrides.

4. The reaction product of claim 2 in which the anhydride is trimellitic anhydride.

* * * * *